United States Patent Office 3,082,181
Patented Mar. 19, 1963

3,082,181
ORGANOPOLYSILOXANE ELASTOMERS CONTAINING A FILLER AND A CARBOXYLIC ACID SALT OF IRON OR MANGANESE
Donald V. Brown, Schenectady, N.Y., and Glennard R. Lucas, Pittsfield, Mass., assignors to General Electric Company, a corporation of New York
No Drawing. Filed Aug. 14, 1957, Ser. No. 678,035
17 Claims. (Cl. 260—18)

This invention relates to modified silicone compositions. More particularly, the invention is concerned with a composition of matter comprising (1) an organopolysiloxane convertible by heat to the cured, solid, elastic state, and (2) a small amount of a metallic salt of an organic carboxylic acid in which the metal ion is selected from the class consisting of iron, cobalt and manganese.

One of the objects of this invention is to improve the compression set of silicone rubbers and thus to permit the manufacture of silicone rubber gaskets which can be employed at elevated temperatures without undue permanent set at these temperatures.

Another object of the invention is to obtain silicone rubbers of low compression set which have improved physical properties, particularly tensile strength and percent elongation over those usually obtained employing many of the previously known compression set additives.

A still further object of the invention is to improve the heat resistance of cured silicone rubber products.

Silicone rubbers in the cured, substantially infusible and insoluble state have found eminent use in many applications where continued exposure to elevated temperatures without undue deterioration is a requirement. It has been found that although silicone rubber can resist high temperatures for long periods of time, nevertheless if the silicone rubber is maintained in a compressed state at these elevated temperatures, it becomes permanently deformed when the pressure is released. Although the recovery is partial, in many applications, particularly in gasketing applications, it is highly desirable that this permanent deformation be reduced to a minimum in order to obtain the best sealing effects.

U.S. Patent 2,448,530 issued September 7, 1948, and assigned to the same assignee as the present invention, discloses the use of mercury, oxides of mercury and salts of mercury as additives for incorporation in the silicone rubber prior to vulcanization thereof for the purpose of improving the compression set of the cured or vulcanized silicone rubber. Although the mercury and the mercury compounds are quite effective in improving the compression set, because of the chemical nature of such compositions, extreme care must be exercised in using these materials because of the possible toxic effects.

We have discovered that unexpectedly a new class of materials are also effective in improving the compression set of the vulcanized silicone rubber, and that these additives which are used for this purpose do not require any particular care or precaution since they have scarcely any handling toxicity and can be used with minimum precautions. The materials which we have found are eminently suitable for improving the compression set are of a certain class of metallic salts of organic carboxylic acids, the description of which is more particularly described below.

Among the suitable carboxylic acid radicals of organic acids which are capable of yielding the improved results described above are those yielding the resinate, linoleate, stearate, oleate, laurate, naphthenate, tallate, benzoate, phthalate, citrate, maleate, as well as lower acid radicals such as those yielding the acetate, butyrate, octoate, etc. The metal ions of the metallic salts which are employed in the practice of the present invention are selected from the class consisting of iron, manganese, and cobalt. More specific examples of salts of organic carboxylic acids which may be employed in the practice of the present invention are, for instance, ferric octoate (e.g., ferric 2-ethylhexoate), ferrous butyrate, ferric naphthenate, ferric acetate, cobalt octoate, cobalt naphthenate, cobalt tallate, manganese octoate, manganese naphthenate, manganese oleate, manganese stearate, etc.

The amount of the metallic salt of the organic carboxylic acid (hereinafter referred to as "metallic salt") employed is usually quite small. Preferably the amount of metal added as the salt of the carboxylic acid ranges from about 0.0001 to 1%, e.g., from 0.001 to 0.4%, by weight, based on the weight of the convertible organopolysiloxane. The amount of the metallic salt which may be used may be varied depending upon such conditions as the type of vulcanizable organopolysiloxane employed, the kind of filler used in making the silicone rubber, the specific metallic salt employed, the application for which the vulcanized silicone rubber is intended, etc. Amounts below 0.001% metal will not appreciably improve properties while amounts of metal above 1% will tend to give softer products indicating some interference with the curing mechanism. It is desirable that the metallic salt employed be soluble or readily dispersible in the convertible organopolysiloxane (which will be described below), or that it can be dissolved in a suitable organic solvent, for instance, in the form of a dilute solution of toluene, benzene, trichloroethylene, hexane, mineral spirits, etc. Such solutions preferably contain from about 1 to 25% or more, by weight, of the metal in the form of the metallic salt.

The convertible silicone composition, which may be highly viscous masses or gummy, elastic solids, depending on the state of condenstation, the condensing agent employed, the starting organopolysiloxane used to make the convertible organopolysiloxane, etc., will hereinafter be referred to as "convertible organopolysiloxane" or, more specifically, as "convertible methylpolysiloxane." They generally have the formula

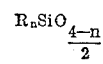

$$R_nSiO_{\frac{4-n}{2}}$$

where R is a monovalent organic radical, for instance, a monovalent hydrocarbon radical or a halogenated monovalent hydrocarbon radical, and $n$ has a value of from 1.9 to 2.1. For purposes of illustrating the various convertible organopolysiloxanes which may be employed in the practice of the present invention, attention is directed to Agens Patent 2,448,756 or Sprung et al. Patent 2,448,556, both of the aforementioned patents having issued September 7, 1948, Sprung Patent 2,484,595 issued October 11, 1949, Krieble et al. Patent 2,457,688 issued December 28, 1948, Hyde Patent 2,490,357, issued December 6, 1949, Marsden Patent 2,521,528 issued September 5, 1950, and Warrick Patent 2,541,137 issued February 13, 1951.

Other convertible organopolysiloxanes containing the same or different silicon-bonded organic substituents (e.g., the R group mentioned above), for instance, monovalent hydrocarbon radicals (e.g., methyl, ethyl, propyl, cyclohexyl, cyclopentyl, phenyl, tolyl, xylyl, benzyl, phenylethyl, naphthyl, etc., radicals), halogenated monovalent hydrocarbon radicals (e.g., chlorophenyl, trichlorophenyl, tetrachlorophenyl, difluorophenyl, bromophenylethyl, etc., radicals), mixed organic radicals (e.g., both methyl and phenyl, etc., radicals) connected to silicon atoms by carbon-silicon linkages, may be employed without departing from the scope of the invention. The presence of small molar concentrations (e.g., from 0.01 to 2 mol percent)

of silicon-bonded alkenyl radicals, e.g., vinyl, allyl, etc. groups, is not precluded.

The particular convertible organopolysiloxane used is not critical and may be any one of those described in the foregoing patents which are generally obtained by condensation of an organopolysiloxane containing an average of from about 1.9, preferably from 1.98, to about 2.1 organic groups per silicon atom. The usual condensing agents which may be employed and which are well known in the art may include, for instance, ferric chloride, alkaline condensing agents, such as potassium hydroxide, cesium hydroxide, etc. These convertible organopolysiloxanes generally comprise polymeric diorganosiloxanes which may contain, for example, up to 1 mol percent copolymerized monoorganosiloxane, for example, copolymerized monomethylsiloxane. Generally, we prefer to use as the starting organopolysiloxane (which may be liquid at room temperature) from which the convertible organopolysiloxane is prepared, one which contains about 1.999 to 2.01, inclusive, organic groups, for example, methyl groups, per silicon atom and where more than about 75% of the silicon atoms in the polysiloxane contain two silicon-bonded alkyl groups. These starting organopolysiloxanes (or mixtures thereof) preferably comprise organic substituents consisting essentially of monovalent organic radicals attached to silicon through carbon-silicon linkages, and in which the siloxane units comprise units of the structural formula $R_2SiO$ where R has the meaning given above. Preferably, at least 90% of the total number of R groups are methyl radicals. The polysiloxane may be one in which all of the siloxane units are $(CH_3)_2SiO$ or the siloxane may be a copolymer of dimethylsiloxane and a minor amount (e.g., from 1 to 20 mol percent) of any of the following units alone or in combination therewith:

$$C_6H_5(CH_3)SiO \text{ and } (C_6H_5)_2SiO$$

A small amount of a curing agent, for instance, organic peroxides, such as benzoyl peroxide, tertiary butyl perbenzoate, bis-(2,4-dichlorobenzoyl) peroxide, ditertiary butyl peroxide, etc., may be incorporated into the convertible organopolysiloxane for the purpose of accelerating its cure. The amount of curing agent which may be used may be varied, for example, from about 0.1 to about 8 or more percent, preferably from about 1 to 4%, by weight, based on the weight of the convertible organopolysiloxane. Conversion to the cured state may also be accomplished without curing agents, as, for instance, by irradiation with high energy electrons, as is more particularly described in Lewis et al. Patent 2,763,609 issued September 18, 1956, and assigned to the same assignee as the present invention.

The convertible organopolysiloxane may be compounded with various fillers on ordinary rubber compounding mills, for example, silica, precipitated silicas, silica aerogel, fume silica, diatomaceous earth, titanium dioxide, calcium silicate, ferric oxide, cadmium sulfide, asbestos, glass fibers, calcium carbonate, carbon black, lithopone, talc, gamma aluminum oxide, etc., and molded, extruded, cast or otherwise shaped as by heating under pressure, to form products having physical characteristics, e.g., elasticity, compressibility, etc., similar to those of natural rubber and other known synthetic rubbers.

The elastomers comprising the cured organopolysiloxanes of the present invention are particularly characterized by their improved compression set characteristics and greater thermal stability as compared with silicone rubbers similarly made, but having none of the metallic salts described above incorporated therein. Other properties, for instance, hardness, tensile strength, and elongation, are much the same and usually better than those of the cured gum composition from which the specific metallic salts mentioned above are omitted.

In order that those skilled in the art may better understand how the present invention may be practiced, the following examples are given by way of illustration and not by way of limitation. All parts are by weight.

EXAMPLE 1

A convertible methylpolysiloxane gum having an average of about two methyl groups per silicon atom was prepared by heating at a temperature of about 140° C. for about 4 to 6 hours, octamethylcyclotetrasiloxane with about 0.01%, by weight, potassium hydroxide. As a result of this, there was obtained a high molecular weight benzene soluble polydimethylsiloxane which was substantially non-flowable at room temperature. This composition will hereinafter be referred to as "convertible methylpolysiloxane." This convertible methylpolysiloxane was washed to remove the potassium hydroxide condensing agent therein, and thereafter was mixed with a finely divided precipitated silica (known as Hi-Sil X303 manufactured by Columbia-Southern Chemical Corporation prepared by adjusting the pH of an aqueous solution of sodium silicate and precipitating the silica with an acid, e.g., hydrochloric acid; this filler which has a pH of from about 7.0 to 8.0, has an average particle diameter of about 20 to 25 millimicrons and a surface area of about 140 to 160 square meters per gram), benzoyl peroxide (as a curing agent), and varying amounts of metals in the form of metallic salts dissolved in mineral spirits. The basic formulation was as follows:

| | Parts |
|---|---|
| Convertible methylpolysiloxane | 100 |
| Precipitated silica | 50 |
| Benzoyl peroxide | 1.2 |
| Metal (in the form of a 6% solution of the metal salt in mineral spirits) | 0.03 |

Each mixture of ingredients was molded in a closed mold in the form of flat sheets (from which test specimens could be cut) at about 130° C. for about 15 minutes at a pressure of approximately 500 p.s.i. Thereafter, samples were removed from the press, heated for 24 hours at 250° C. in an air-circulating oven and thereafter the compression set characteristics were ascertained by a modification of ASTM D-395-49T. This modification (unless otherwise stated) included heating the compression set samples for 22 hours at 177° C. For the compression set test, disks were cut from the molded and heat-treated sheets described above. These disks were superposed upon one another until a cylinder ½ inch high was obtained. This cylinder which, for brevity, will hereinafter be referred to as a "plug" was compressed to 70% of its original thickness between steel plates and was then heated while under this compression at about 150° C. for 6 hours, and then was cooled to room temperature. The pressure was released and the thickness of the resulting plug measured 30 minutes thereafter. The figures given in Table I below show the compression set of the plugs as a result of the treatment. A 100% compression set would indicate no recovery while a zero compression set would mean that the plug had returned to its original thickness after release of the pressure.

The following Table I shows the improvements in compression set realized employing the various metallic salts as compared to a control from which a compression set additive was omitted.

*Table I*

| Test No. | Metallic Salt | Percent Compression Set |
|---|---|---|
| Control | None | 81 |
| 1 | Iron Octoate [1] | 65 |
| 2 | Cobalt Octoate | 68 |
| 3 | Cobalt Naphthenate | 65 |
| 4 | Cobalt Tallate | 66 |
| 5 | Manganese Octoate | 56 |

[1] Ferric octoate.

EXAMPLE 2

In this example a formulation similar to that used in Example 1 was employed with the exception that essentially pure iron octoate free of solvent was employed instead of in the form of a mineral spirits solution. The amount of iron (in the form of the iron octoate, i.e., ferric octoate, solution described in Example 1) used was varied over a wide range. The molding cycle, as well as the testing, were similar to that described in Example 1. The following Table II shows the compression set characteristics of the cured samples containing the iron octoate.

*Table II*

| Test No. | Parts Iron[1] | Percent Compression Set |
| --- | --- | --- |
| Control | 0 | 75 |
| 6 | 0.036 | 67 |
| 7 | 0.072 | 57 |
| 8 | 0.144 | 34 |

[1] Per one hundred parts of the convertible methylpolysiloxane.

EXAMPLE 3

In this example the convertible methylpolysiloxane was mixed with the precipitated silica recited in Example 1, employing 100 parts of the convertible methylpolysiloxane and 50 parts of the precipitated silica. Different catalysts in varying concentrations were employed with the iron (ferric) octoate which in each instance was in the form of a 6%, by weight, solution in mineral spirits. Each of the samples was molded at about 140° C. for about 15 minutes at a pressure of approximately 500 p.s.i., then cured in an air-circulating oven for 24 hours at 150° C. and finally at 72 hours at 250° C., after which the compression set characteristics were determined similarly as those described in Example 1. The following Table III shows the various formulations used, particularly the organic peroxide curing agent, the concentration of the latter, the presence or absence of the iron octoate solution as well as the compression set characteristics after 22 hours at 177° C.

*Table III*

| Test No. [1] | Curing Agent and Percent [1] | Parts Iron | Percent Compression Set |
| --- | --- | --- | --- |
| 9 | Benzoyl peroxide (1.5%) | 0.12 | 25.1 |
| 10 | Bis-(2,4-dichlorobenzoyl) peroxide (1.5%) | 0.12 | 25.5 |
| 11 | Bis-(2,4-dichlorobenzoyl) peroxide (3.0%) | 0.12 | 20.3 |
| 12 | Benzoyl peroxide (1.5%) | None | 52.7 |
| 13 | Bis-(2,4-dichlorobenzoyl) peroxide (1.5%) | None | 46.7 |
| 14 | Bis-(2,4-dichlorobenzoyl) peroxide (3.0%) | None | 60.2 |

[1] Percent curing agent is based on the weight of the convertible methylpolysiloxane.

The function and effect of the metallic salts of the present invention in combination with convertible organopolysiloxanes are entirely different from the effects of metallic salts on organopolysiloxane resins where such salts are specifically employed as curing agents as disclosed and claimed in U.S. Patent 2,449,572, issued September 21, 1948 and assigned to the same assignee as the present invention. The following example establishes this fact.

EXAMPLE 4

In this example a mixture of ingredients was prepared from 100 parts of the convertible methylpolysiloxane of Example 1, 50 parts precipitated silica, and 2 parts of the 6% iron octoate mineral spirits solution (0.12 part iron). This mixture of ingredients was molded similarly as was done in Example 1 for 15 minutes at about 140° C. and thereafter cured in an oven for 24 hours at 250° C. The sample obtained after this heat treatment was essentially the same as the sample was before any molding or heat treatment, indicating that no cure of the convertible methylpolysiloxane was produced using the metallic salt, in this instance iron octoate.

EXAMPLE 5

This example shows the advantage of using the metallic salts of the present invention for improving the heat resistance and other properties of cured organopolysiloxane elastomers. The basic formulation was composed of 34 parts of the convertible methylpolysiloxane (described in Example 1), 15.3 parts precipitated silica, and 1.02 parts of a methyl silicone oil dispersion of benzoyl peroxide (50% of the dispersion was benzoyl peroxide). To portions of the basic formulation were added varying amounts of iron (as the 6% iron octoate in mineral spirits). These formulations, including a control which contained no iron, were molded for about 15 minutes at 140° C. under a pressure of 500 p.s.i., and thereafter heated in an air circulating oven, first for one hour at 150° C. and thereafter for 24 hours at 250° C. The physical properties of the molded and heat-aged samples were taken after the 150° C. heat-aging and after 250° C. heat-aging. The compression set characteristics were determined after the 250° C. heating employing essentially the same condition as described in Example 1, but conducting the compression set test for a period of about 70 hours at 150° C. The following Table IV shows the proportion of iron employed, as well as the various physical properties of the molded samples including the compression set characteristics.

*Table IV*

| Sample Number | 15 | 16 | 17 | 18 | 19 |
| --- | --- | --- | --- | --- | --- |
| Parts Iron (as the iron octoate solution) | 0 | 0.015 | 0.03 | 0.06 | 0.12 |
| Aged 1 hour at 150° C.: | | | | | |
| Tensile, p.s.i. | 698 | 957 | 741 | 642 | 433 |
| Percent Elongation | 270 | 360 | 445 | 550 | 570 |
| Tear resistance | 39 | 53 | 60 | 78 | 105 |
| Aged 24 hours at 250° C.: | | | | | |
| Tensile, p.s.i. | 673 | 729 | 735 | 698 | 764 |
| Percent Elongation | 250 | 270 | 275 | 250 | 230 |
| Percent Compression Set | 76 | 71 | 55 | 44 | 25 |

One of the unexpected advantages of using the metallic salts in combination with convertible organopolysiloxanes is the ability to improve the heat resistance of the cured product. The following example shows this quite clearly.

EXAMPLE 6

In this example, a formulation was prepared from 150 parts of the convertible methylpolysiloxane described in Example 1, 60 parts silica aerogel (Santocel CS manufactured by Monsanto Chemical Company), and 2.4 parts benzoyl peroxide. Another formultaion was prepared similarly as above with the exception that there was added, in addition, 0.045 part iron (as the 6% iron octoate mineral spirits solution described above). Each of the formulations was molded in a press for 20 minutes at 30 lbs. steam (about 140° C.) for about 15 minutes and thereafter the molded sheets were placed in a 300° C. air circulating oven and heated 144 hours at this temperature. At the end of this time, the sample which contained the iron octoate had retained much of its original appearance and flexibility. In contrast to this, the sample from which the iron octoate was omitted had become so hard and brittle that it disintegrated into small chips.

One of the unexpected features of the present invention is that the advantages to be derived from these iron, cobalt, and manganese salts of organic carboxylic acids, are specific to these salts. Thus, it has been found that if one incorporates, for instance, an organic metallic salt such as lead naphthenate in a silicone rubber, no advantage is derived from the presence of such a salt. The following example illustrates this clearly.

EXAMPLE 7

A curable silicone rubber formulation was prepared from 150 parts of the convertible methylolysiloxane described in Example 1, 60 parts silica aerogel and 2.4 parts benzoyl peroxide. Two other formulations were prepared similarly as above with the exception that in one case there was added 0.045 part iron (in the form of a 6% weight mineral spirits iron octoate solution) and in the other case there was added 0.045 part lead (in the form of a 24% weight lead naphthenate solution). Each of the three above-described formulations was molded into a test sheet in a press for 10 minutes at about 140° C., and thereafter the molded sheets were heat-treated for one hour at 150° C. and for one hour at 250° C. The heat-treated sheets were placed in a 300° C. air circulating oven and heated for 24 hours at this temperature. At the end of this time the control containing no metallic salt as well as the formulation containing lead naphthenate were found to be brittle, cracked, and powdered quite easily. In contrast to this, the sample containing the iron octoate was quite flexible and could be bent through a 180° bend without any cracking occurring; the Shore hardness of this sample was 75, the tensile strength was 550 p.s.i., and the percent elongation was 100%, indicating clearly the eminent aging superiority induced by the iron salt.

It will, of course, be apparent to those skilled in the art that in addition to the convertible organopolysiloxane employed in the foregoing examples, other organopolysiloxanes, many examples of which have been given previously, may be used without departing from the scope of the invention. Additionally, other types of vulcanization accelerators or curing agents, besides the peroxides described above, may also be employed. Various other fillers may be used, and obviously the amount of filler may be varied considerably depending, for example, on the particular filler employed, its particle size, the specific convertible organopolysiloxane used, the purpose for which the finished product is to be used, etc. Thus, filled organopolysiloxanes may be produced containing, on a weight basis, from about 0.15 to 3 parts of filler per part of convertible organopolysiloxane, for example, heat-convertible polydimethylsiloxane. When one employs, for instance, silica aerogel, fume silica, or precipitated silica as the filler, the amount of such filler which may advantageously be used with the convertible organopolysiloxane is much less than usual fillers, especially when the benzene-soluble, convertible organopolysiloxanes described above, having slight flow at room temperature, are used. In such instances, the amount of silica which may be tolerated in the filled composition is generally below 50 to 60 parts of the silica filler per 100 parts of the convertible organopolysiloxane. Although reinforcing silica fillers are preferred (such as those described in U.S. 2,541,137) any silica filler is operative in this invention. The amount of metallic salt used may also be varied but generally no particular advantage is derived from incorporating amounts of the metal (as the metallic salt) in excess of 1%. Amounts much greater than these values may undesirably affect the properties of the silicone rubber.

The products of this invention are useful in such applications, for instance, as gaskets, tubing, electrical conductor insulation, shock absorbers, etc. They are particularly suitable for use as gaskets in applications involving high temperature compression conditions especially in those places where they may be subjected to the effects of halogenated hydrocarbons as insulating media, namely, in the manufacture of capacitors. Because of their resistance to heat, they have value as materials for use in applications where natural or other synthetic rubbers fail owing to the deleterious effect of heat. Elastomers produced by the practice of our invention have the additional property of retaining their flexibility at low temperatures, e.g., at temperatures as low as −60° C. Solutions or dispersions of the herein described compositions can also be prepared and used for coating and impregnating purposes of various surfaces and fibrous materials (e.g., glass cloth, asbestos cloth, etc.) and thereafter converted, for instance, by heat or other means (e.g., high energy electrons) to give heat-resistant and water-repellent surfaces. Laminated products from such coated and impregnated sheet material can also be prepared using techniques well-known in the art.

This application is a continuation-in-part of our applications, Serial No. 612,951 filed October 1, 1956, now abandoned, and of Serial No. 654,076, filed April 22, 1957, now abandoned, both assigned to the same assignee as the present invention.

What we claim as new and desire to secure by Letters Patent of the United States is:

1. A composition of matter comprising (1) an organopolysiloxane convertible to the cured, solid, elastic state, (2) a filler, and (3) a small amount of a metallic salt of an organic carboxylic acid, the metallic ion being selected from the class consisting of iron and manganese.

2. A heat-curable organopolysiloxane rubber stock consisting essentially of (a) an organosilicon compound of the average general formula $$R_nSiO_{\frac{4-n}{2}}$$

where R represents an organic radical selected from the group consisting of monovalent hydrocarbon radicals and halogenated monovalent hydrocarbon radicals and n has a value of 1.9 to 2.1, (b) a silica filler and (c) from 0.001 to 0.400 part, by weight, per 100 parts of (a), of iron added as an iron salt of a carboxylic acid, and (d) an organoperoxide vulcanizing agent.

3. A heat-curable organopolysiloxane rubber stock consisting essentially of (a) an organosilicon compound of the average general formula $$R_nSiO_{\frac{4-n}{2}}$$

where R represents an organic radical selected from the group consisting of monovalent hydrocarbon radicals and halogenated monovalent hydrocarbon radicals and n has a value of 1.9 to 2.1, (b) a precipitated silica filler and (c) from 0.001 to 0.400 part, by weight, per 100 parts of (a), of iron added as an iron salt of a carboxylic acid, and (d) an organoperoxide vulcanizing agent.

4. A heat-curable organopolysiloxane rubberstock consisting essentially of (a) a dimethylpolysiloxane, (b) a precipitated silica filler, (c) 0.001 to 0.4 part, by weight, based on 100 parts of (a) of an iron salt of a carboxylic acid and (d) an organoperoxide vulcanizing agent.

5. An organosiloxane elastomer consisting essentially of (a) an organosilicon compound of the average general formula $$R_nSiO_{\frac{4-n}{2}}$$

wherein R represents an organic radical selected from the group consisting of monovalent hydrocarbon radicals and halogenated monovalent hydrocarbon radicals and n has a value of 1.9 to 2.1, (b) a silica filler, and (c) from 0.001 to 0.400 part, by weight, per 100 parts of (a), of iron added as an iron salt of a carboxylic acid.

6. An organosiloxane elastomer consisting essentially of (a) an organosilicon compound of the average general formula $$R_nSiO_{\frac{4-n}{2}}$$

wherein R represents an organic radical selected from the group consisting of monovalent hydrocarbon radicals and halogenated monovalent hydrocarbon radicals and n has a value of 1.9 to 2.1, (b) a precipitated silica filler, and (c) from 0.001 to 0.400 part, by weight, per 100 parts of (a), of iron added as an iron salt of a carboxylic acid.

7. An organosiloxane elastomer consisting essentially of (a) a dimethylsiloxane, (b) a precipitated silica filler, (c) 0.001 to 0.400 part, by weight, based on 100 parts of (a) of an iron salt of a carboxylic acid.

8. A heat-curable organopolysiloxane rubber stock consisting essentially of (a) a dimethylpolysiloxane, (b) a precipitated silica filler, (c) 0.001 to 0.4 part, by weight, based on 100 parts of (a) of ferric octoate, (d) an organoperoxide vulcanizing agent.

9. An organosiloxane elastomer consisting essentially of (a) a dimethylsiloxane, (b) a precipitated silica filler, (c) 0.001 to 0.400 part, by weight, based on 100 parts of (a) of ferric octoate.

10. An organosiloxane elastomer consisting essentially of (a) a polydimethylsiloxane, (b) a finely divided silica filler, and (c) from 0.001 to 0.400 part, by weight, based on 100 parts of (a), of iron added as ferric octoate.

11. A composition of matter comprising (1) a polydimethylsiloxane convertible to the cured, solid, elastic state, (2) a filler, and (3) a small amount of iron octoate.

12. An elastomer comprising the heat-cured, elastic product of claim 1.

13. A heat-curable composition of matter containing (1) a methylpolysiloxane convertible to the cured, solid, elastic state, (2) a finely divided silica filler, (3) a curing agent for (1), and (4) from 0.001 to 1 percent, by weight, manganese as manganese octoate, based on the weight of (1).

14. A product comprising the heat-cured composition of claim 4.

15. The method which comprises (1) incorporating a filler, a curing agent, and from 0.001 to 1 percent, by weight, of a metal in the form of a metallic salt of an organic carboxylic acid in which the metallic salt is selected from the class consisting of iron and manganese into an organopolysiloxane convertible by heat to the cured, solid, elastic state, and (2) heating the mixture of ingredients at an elevated temperature to convert the latter to the cured state.

16. A composition of matter comprising (1) an organopolysiloxane convertible to the cured, solid, elastic state, (2) a precipitated silica filler, and (3) a small amount of a metallic salt of an organic carboxylic acid, the metallic ion being selected from the class consisting of iron and manganese.

17. The method which comprises (1) incorporating a precipitated silica filler, a curing agent, and from 0.001 to 1 percent, by weight, of a metal in the form of a metallic salt of an organic carboxylic acid in which the metallic salt is selected from the class consisting of iron and manganese salts into an organopolysiloxane convertible by heat to the cured, solid elastic state, and (2) heating the mixture of ingredients at an elevated temperature to convert the latter to the cured state.

References Cited in the file of this patent

UNITED STATES PATENTS

| | | |
|---|---|---|
| 2,449,572 | Welsh | Sept. 21, 1948 |
| 2,759,904 | Talcott | Aug. 21, 1956 |
| 2,999,076 | Talcott | Sept. 5, 1961 |

OTHER REFERENCES

Pfeifer India Rubber World, pages 481–8, India Rubber World, vol. 129, No. 4 (January 1954).